W. R. UHLEMANN.
EYEGLASS MOUNTING.
APPLICATION FILED JAN. 13, 1911.
1,036,036.
Patented Aug. 20, 1912.
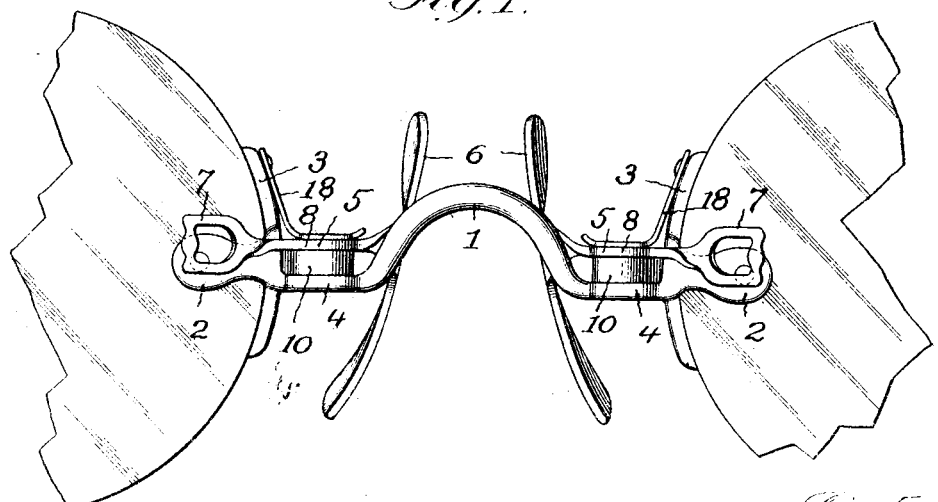
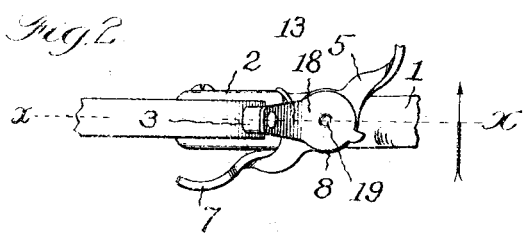
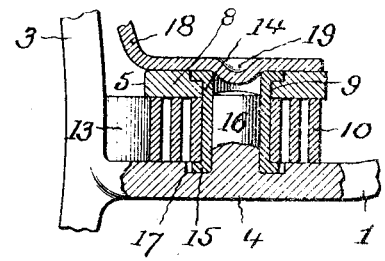
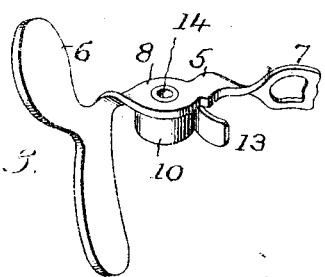
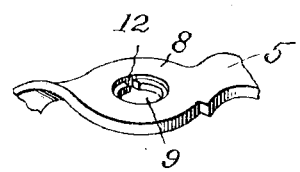
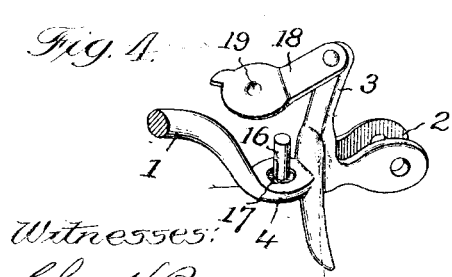
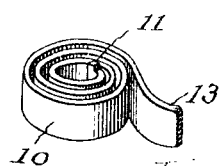
Witnesses:
Chas. H. Buell
Henry Moe
Inventor:
William R. Uhlemann,
by Robert Burns Atty

UNITED STATES PATENT OFFICE.

WILLIAM R. UHLEMANN, OF CHICAGO, ILLINOIS.

EYEGLASS-MOUNTING.

1,036,036.  Specification of Letters Patent.  Patented Aug. 20, 1912.

Application filed January 13, 1911. Serial No. 602,429.

*To all whom it may concern:*

Be it known that I, WILLIAM R. UHLEMANN, a citizen of the United States of America, and a resident of Chicago, in the county of Cook, State of Illinois, have invented certain new and useful Improvements in Eyeglass-Mountings, of which the following is a specification.

This invention relates to that class of eyeglass mountings in which the nose guards are carried by a pair of finger pieces or levers pivoted at the base of the bridge which connects the lenses. And the present improvement has for its object to provide a simple and efficient structural arrangement and combination of parts whereby the finger pieces or levers, with their attached guards and springs are made removable and replaceable in a ready and convenient manner.

Another object of the present improvement is to provide a simple and efficient connection between a finger piece or lever and spring whereby the two parts may be initially assembled and subsequently handled as a whole by the trade in making replacements and the like, all as will hereinafter more fully appear.

In the accompanying drawings:—Figure 1, is a front elevation of an eyeglass mounting embodying the present invention. Fig. 2, is a fragmentary plan view of the same. Fig. 3, is a detail perspective view of a finger piece and its attached spring. Fig. 4, is a similar view of a portion of the bridge, its lens attaching straps and accessories. Fig. 5, is an enlarged section on line *x—x*, Fig. 2, showing the pivotal attachment of a finger piece and its accessories to the bridge. Fig. 6, is a detail perspective view of the middle or hub portion of a finger piece. Fig. 7, is a detached perspective view of the spring for the finger piece.

Similar numerals of reference indicate like parts in the several views.

Referring to the drawing, 1 represents the usual rigid bridge having at its respective ends the attaching straps 2 and braces 3 by which connection is made with the respective eyeglass lenses, as usual. Said bridge is also provided with the usual straight portions 4 intermediate of the straps 2 and the arch portion of the bridge for the pivotal attachment of the finger pieces or levers of the mounting.

5 are the finger pieces or levers above referred to, and which carry at their rear ends the usual nose guards 6, and at their forward ends the usual manipulating finger grips 7 as shown. In addition said finger pieces are formed with central hub portions 8, which in turn are provided with orifices 9 for the pivotal means hereinafter described.

10 are the volute springs by which the aforesaid finger pieces 5 are actuated in one direction. Said springs are located at the underside of the finger pieces and between the same and the straight portion 4 of the bridge as shown more particularly in Fig. 5. The described arrangement of the springs 10, as well as their flat ribbon, is fully shown and described in my prior Patent No. 970,577 of September 20, 1910, and no claim thereto is now made except as to the connection thereof to the finger pieces as hereinafter more particularly set forth.

11 is a projecting spur at the inner end of the aforesaid spring 10 for engagement in a corresponding recess 12, at the side of the orifice 9 of a finger piece 5 to provide an operative connection between the parts. At its other and outer end said spring is provided with an extension 13 adapted for bearing engagement against the inner side of an attaching strap 2, as in my aforesaid Letters Patent No. 970,577.

14 is a bushing arranged within the central orifice of the spring 10, and provided at the bottom with a flange 15 for holding engagement beneath the underside of said spring. The upper end of said bushing extends into the orifice 9 of the finger piece 5, and its upper margin is beaded outwardly over said finger piece 5, and preferably into an enlarged counterbore of said orifice 9, as shown, so as to effect a permanent connection of the spring 10 to the finger piece 5, and at the same time provide a flat surface at the top of the finger piece and a compact arrangement of parts.

16 is a stud or stem fixed in any ordinary manner on a straight portion 4 of the bridge 2, and adapted to fit the bore of the aforesaid bushing 14 to constitute the pivotal connection between a finger piece 5 and the bridge 1.

17 is an annular recess formed in the bridge portion 4 and at the base of the stud or stem 16, for the reception of the bottom flange 15 of the bushing, and with a view to provide a compact arrangement of parts.

18 is an angular keeper pivoted at one end to a brace 3, or other suitable part of an eyeglass mounting, while its other end is adapted to bear upon the top of the central hub portion 7 of the finger piece 5, to hold the same in place upon the pivot stud or stem 16 aforesaid. With the described construction the keeper 18 is adapted to be swung to one side to permit of a ready removal and replacement of the finger piece and the parts carried thereby.

19 is a central teat or lug formed in or carried by the end of the keeper 18 which has engagement with the finger piece 5, and adapted to yieldingly engage the upper end of the bore of the bushing 14 to prevent accidental movement of the keeper under ordinary strains. It is within the scope of this part of the present invention to employ any other usual and suitable fastening means in place of the lug or teat 19 just described.

Having thus fully described my said invention what I claim as new and desire to secure by Letters Patent, is:—

1. The combination in an eyeglass mounting of a bridge, a finger piece carrying a guard, a separable pivot connection between the finger piece and the bridge, a spring for moving said finger piece in one direction, and a hinged keeper for holding the finger piece and spring in position, substantially as set forth.

2. The combination in an eyeglass mounting of a bridge, a finger piece carrying a guard, a volute ribbon spring secured to said finger piece and adapted to move the same in one direction, a separable pivot connection between the finger piece and the bridge, and a hinged keeper for holding the finger piece and spring in position, substantially as set forth.

3. The combination in an eyeglass mounting of a bridge, a finger piece carrying a guard, a volute ribbon spring secured to said finger piece by a bushing flanged or beaded at its respective ends, a separable pivot connection between the finger piece and the bridge, and a hinged keeper for holding the finger piece and spring in position, substantially as set forth.

4. The combination in an eyeglass mounting of a bridge, provided with attaching straps and braces, a finger piece carrying a guard, a separable pivot connection between the finger piece and bridge, a spring for moving said finger piece in one direction, and an angular keeper hinged to one of the braces and engaging the finger piece to hold the same in position, substantially as set forth.

5. The combination in an eyeglass mounting of a bridge provided with attaching straps and braces, a finger piece carrying a guard, a separable pivot connection between the finger piece and bridge, a volute ribbon spring secured to said finger piece and adapted to move the same in one direction, and an angular keeper hinged to one of the braces and engaging the finger piece to hold the same in position substantially as set forth.

6. The combination in an eyeglass mounting of a bridge provided with attaching straps and braces, a finger piece carrying a guard, a separable pivot connection between the finger piece and bridge, a volute ribbon spring secured to said finger piece by a bushing flanged or beaded at its respective ends, and an angular keeper hinged to one of the braces and engaging the finger piece to hold the same in position, substantially as set forth.

7. The combination in an eyeglass mounting of a bridge, a finger piece carrying a guard, a separable pivot connection between the finger piece and the bridge, a spring for moving said finger piece in one direction, a hinged keeper for holding the finger piece and spring in position, and means for yieldingly holding the keeper in engagement with the finger piece, substantially as set forth.

8. The combination in an eyeglass mounting of a bridge, a finger piece carrying a guard, a volute ribbon spring secured to said finger piece and adapted to move the same in one direction, a separable pivot connection between the finger piece and the bridge, a hinged keeper for holding the finger piece and spring in position, and means for yieldingly holding the keeper in engagement with the finger piece, substantially as set forth.

9. The combination in an eyeglass mounting of a bridge, a finger piece carrying a guard, a volute ribbon spring secured to said finger piece by a bushing flanged or beaded at its respective ends, a separable pivot connection between the finger piece and the bridge, a hinged keeper for holding the finger piece and spring in position, and means for yieldingly holding the keeper in engagement with the finger piece, substantially as set forth.

10. The combination in an eyeglass mounting of a bridge, provided with attaching straps and braces, a finger piece carrying a guard, a separable pivot connection between the finger piece and bridge, a spring for moving said finger piece in one direction, an angular keeper hinged to one of the braces and engaging the finger piece to hold the same in position, and means for yieldingly holding the keeper in engagement with the finger piece, substantially as set forth.

11. The combination in an eyeglass mounting of a bridge, provided with attaching straps and braces, a finger piece carrying a guard, a separable pivot connection between the finger piece and bridge, a volute ribbon spring secured to said finger piece and adapted to move the same in one direction, an angular keeper hinged to one of the braces and engaging the finger piece to hold the same in position, and means for yieldingly holding the keeper in engagement with the finger piece, substantially as set forth.

12. The combination in an eyeglass mounting of a bridge provided with attaching straps and braces, a finger piece carrying a guard, a separable pivot connection between the finger piece and bridge, a volute ribbon spring secured to said finger piece by a bushing flange or beaded at its respective ends, an angular keeper hinged to one of the braces and engaging the finger piece to hold the same in position, and means for yieldingly holding the keeper in engagement with the finger piece, substantially as set forth.

Signed at Chicago Illinois this 9th day of January 1911.

WILLIAM R. UHLEMANN.

Witnesses:
 LAURA MOE UHLEMANN,
 ROBERT BURNS.